No. 671,353. Patented Apr. 2, 1901.
R. H. REEVES.
METHOD OF TREATING SEWAGE.
(Application filed Dec. 29, 1897.)
(No Model.) 2 Sheets—Sheet 2.

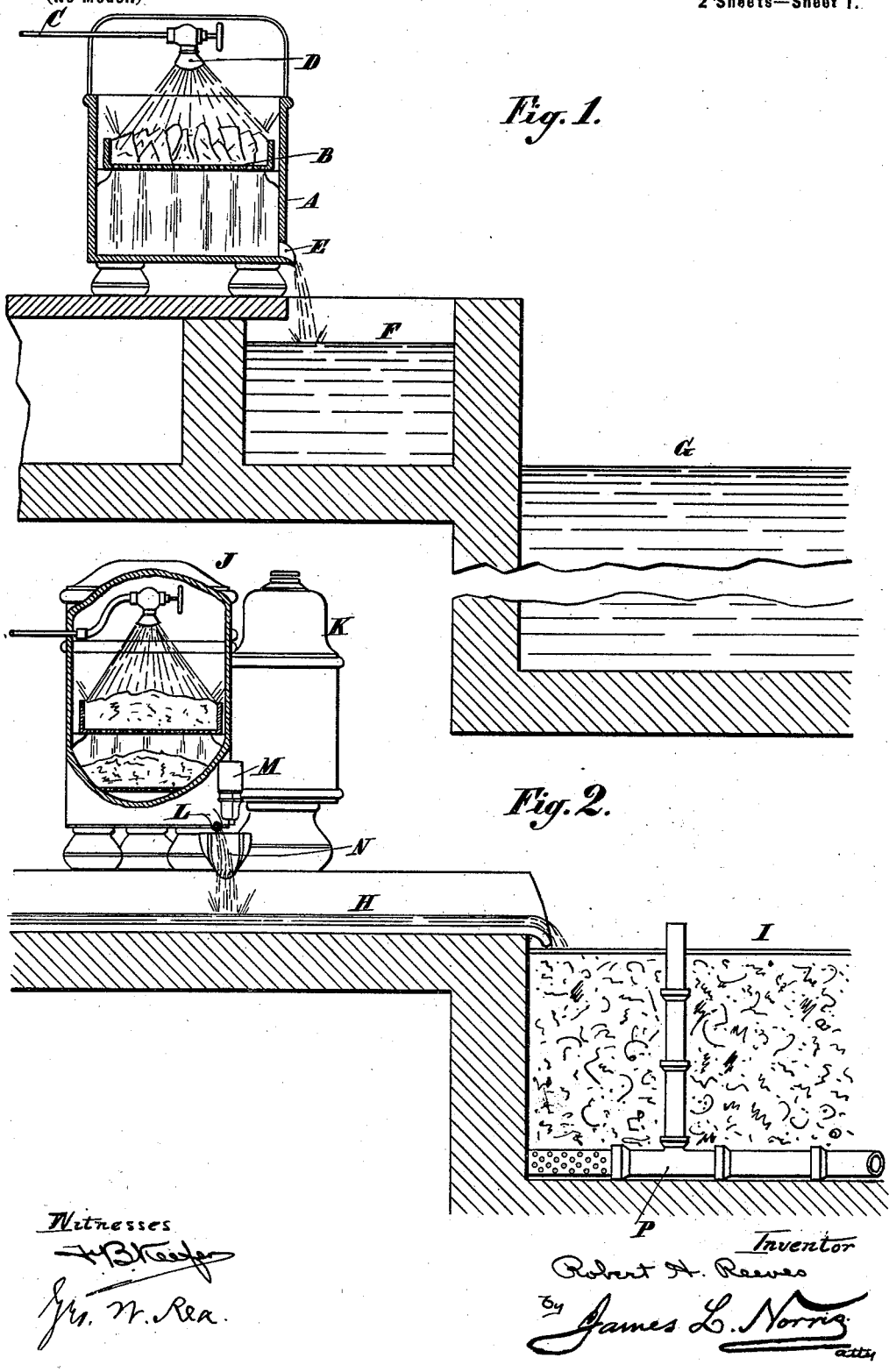

UNITED STATES PATENT OFFICE.

ROBERT HARRIS REEVES, OF LONDON, ENGLAND.

METHOD OF TREATING SEWAGE.

SPECIFICATION forming part of Letters Patent No. 671,353, dated April 2, 1901.

Application filed December 29, 1897. Serial No. 664,455. (No model.)

*To all whom it may concern:*

Be it known that I, ROBERT HARRIS REEVES, a subject of the Queen of Great Britain, residing at Cedardale, Putney Bridge road, Putney, London, England, have invented certain new and useful Improvements in Methods of Treating Sewage, (patented in Great Britain, No. 22,502, dated November 25, 1895,) of which the following is a specification.

The object of this invention is to provide a new and improved method or process for treating sewage and effluent water at precipitating and outfall works in such manner that the sewage is rendered inodorous and nonoffensive and clarified, and the effluent water is purified and suitable to be discharged into streams or rivers with or without land filtration.

In carrying out my invention I first treat the sewage with lime-water for precipitation purposes, the lime-water being prepared by admixture of water supplied at high pressure through a nozzle or rose, so that fine streams of the water attack all parts of the lime for the production of a lime-water of greater strength than when produced by machinery. This lime-water is added to the sewage as it flows to the precipitating-tank and admixing with the former insures a precipitation of the solid matters contained therein. The effluent water from the precipitation-tank passes to the filtering-tank and on its passage is chemically treated with a mixture of manganate of soda and sulfuric acid for the purpose of purifying it, the proportion of the chemicals depending upon the nature of the effluent. If the effluent be strong or foul, the quantity of manganate to that of sulfuric acid will be, say, three to one. The effluent water being thus treated flows into the filtering tank or tanks, which contain burnt ballast, slag, coke-breeze, sand, or other suitable material, the water percolating through and in contact with the material, the effect of which is to deprive it of any impurity and render it fit to be discharged through pipes or otherwise into a river or stream. The sludge is pumped or allowed to flow into suspended tanks, where it settles, the clear top water being decanted off by tilting the tanks and the sludge of the consistency of thickish mortar being placed in beds to dry, similar to the plan adopted for drying peat. When the sludge is required in a dry powdered condition, it is passed through an artificial-drying room, whereby all moisture is removed, the material being then ready for transport.

Figure 3:
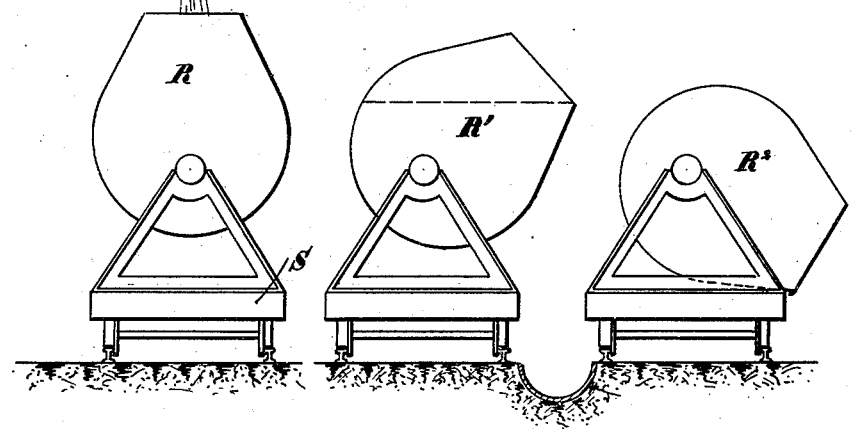
Figure 4:
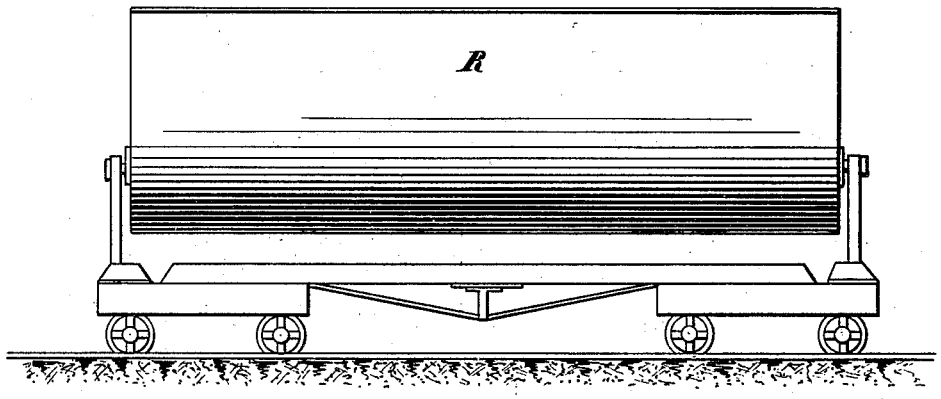

In the accompanying drawings, illustrating apparatus suitable for carrying my invention into effect, Figure 1 is a sectional elevation of the lime-mixing apparatus and the precipitating-tank. Fig. 2 is a similar view showing the appliances for chemically treating the effluent water when flowing from the precipitating to the purifying tanks or land. Fig. 3 is an end elevation of the suspended tanks, showing the manner of decanting. Fig. 4 is a side elevation of one of the suspended tanks.

In the drawings, A indicates the lime-containing vessel, provided with a perforated tray B for holding the unslaked lime, and C a pipe supplying water to a nozzle or rose D for spraying the water under pressure onto and into the lime or other chemical in fine jets, so as to attack all parts of the lime. The lime-water immediately flows through the outlet E into a baffle-race F, where it mixes with the sewage as it flows into the precipitating-tank G, where a precipitation of the solid matter takes place. The effluent water from the precipitating tank or tanks G flows along the channel H into the filtering bed or beds I. During the passage of the effluent water down the channel H it is chemically treated by a mixture of manganate of soda and sulfuric acid, the proportions of which vary according to the condition of the effluent water. The manganate of soda is contained within a vessel J and is treated in the same manner as that described for the lime. The sulfuric acid is contained in the vessel K, and the materials from each vessel drop from the nozzles or outlets L M into the cup or receiver N, where they admix and fall into the effluent water during its passage to the filtering-tanks, where it is further purified by percolating through burnt ballast, slag, coke-breeze, sand, or other suitable material contained therein, the water afterward flowing away through perforated pipes P or other suitable channels to the river or stream. The sludge from the precipitating tank or tanks G is drawn off by the outlet Q into tanks R, suspended on trucks S, such tanks being tilted for decanting purposes, as shown at R', and for emptying, as at R², Fig. 3.

The trucks are preferably arranged on a light line of railway for conveyance to the place where the sludge may be required.

Having thus described my invention, what I claim is—

A method of treating sewage which consists in first subjecting unslaked lime to the action of numerous sprays of water under high pressure, then admixing such lime-water with the sewage to precipitate the solid matter therein and then treating the effluent liquid from the sewage with manganate of soda and sulfuric acid.

In testimony whereof I have hereunto set my hand in presence of two subscribing witnesses.

ROBERT HARRIS REEVES.

Witnesses:
EDMUND STANHOPE SNEWIN,
WILLIAM OSWALD BROWN.